Figure 1:
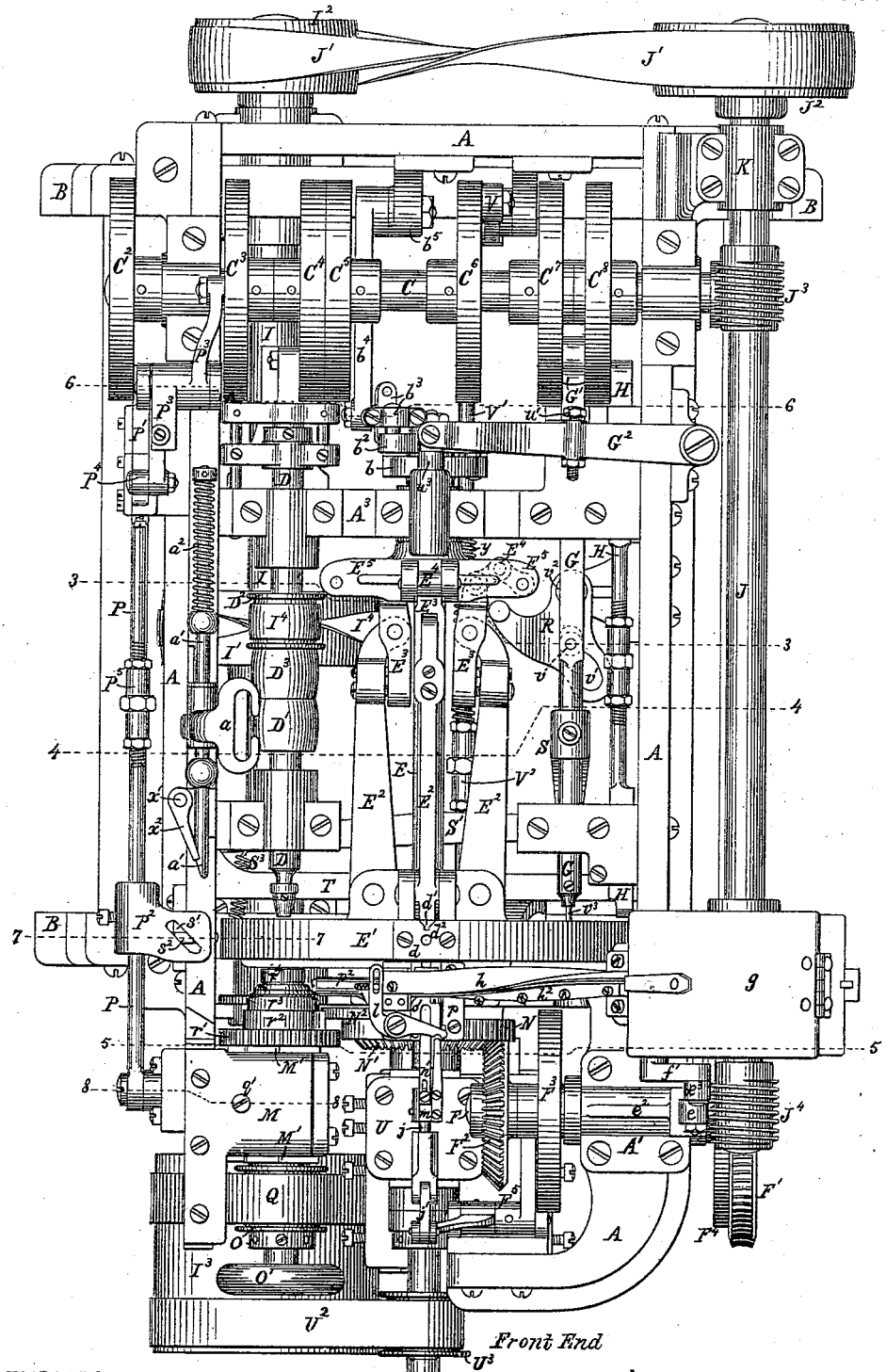

M. BRAY.
Machine for Manufacturing Shoe-Lace Studs.
No. 212,181. Patented Feb. 11, 1879.

WITNESSES:
E. H. Hemmenway
C. H. Dodd

INVENTOR:
Mellen Bray
by N. C. Lombard,
ATTORNEY.

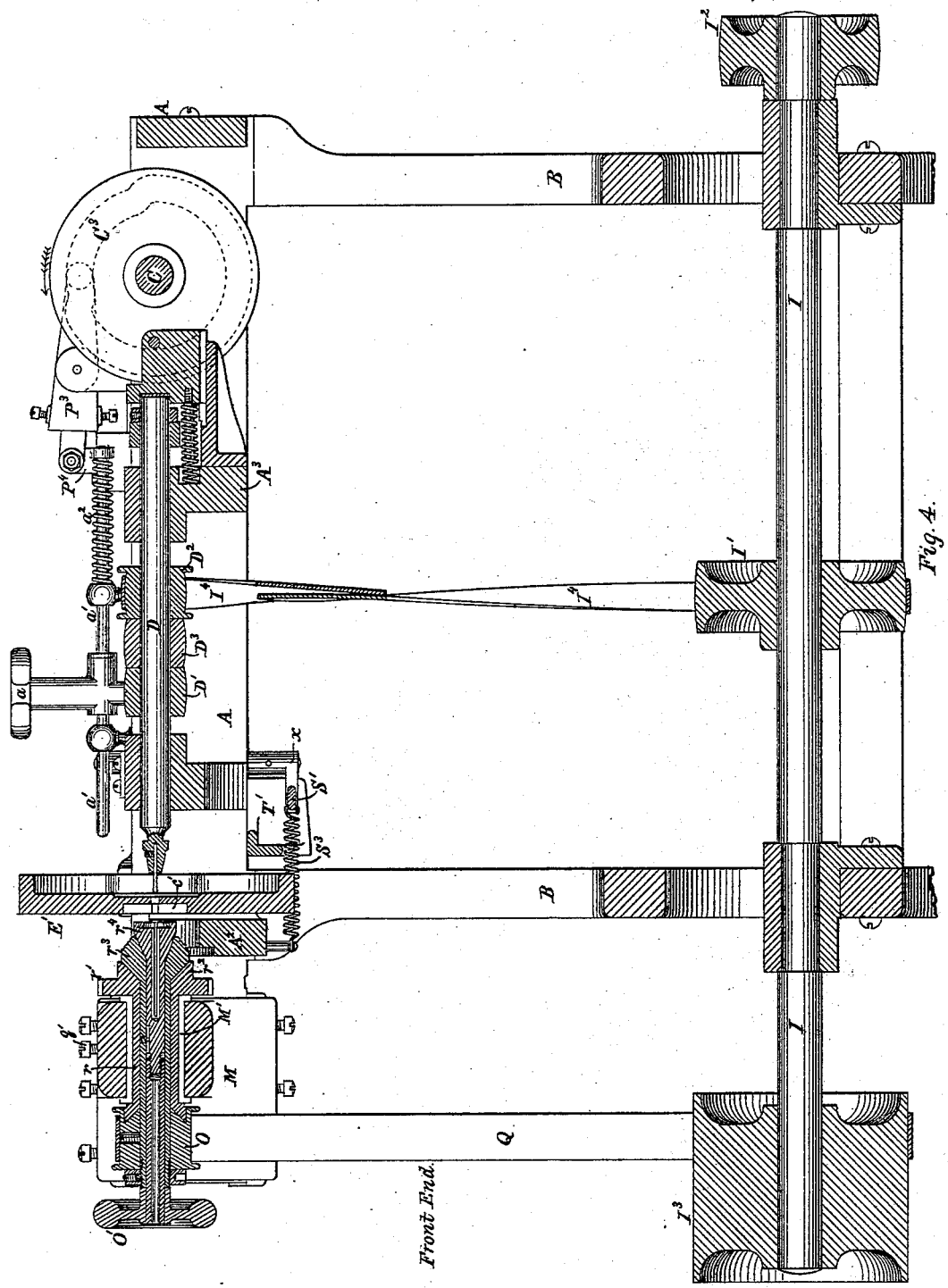

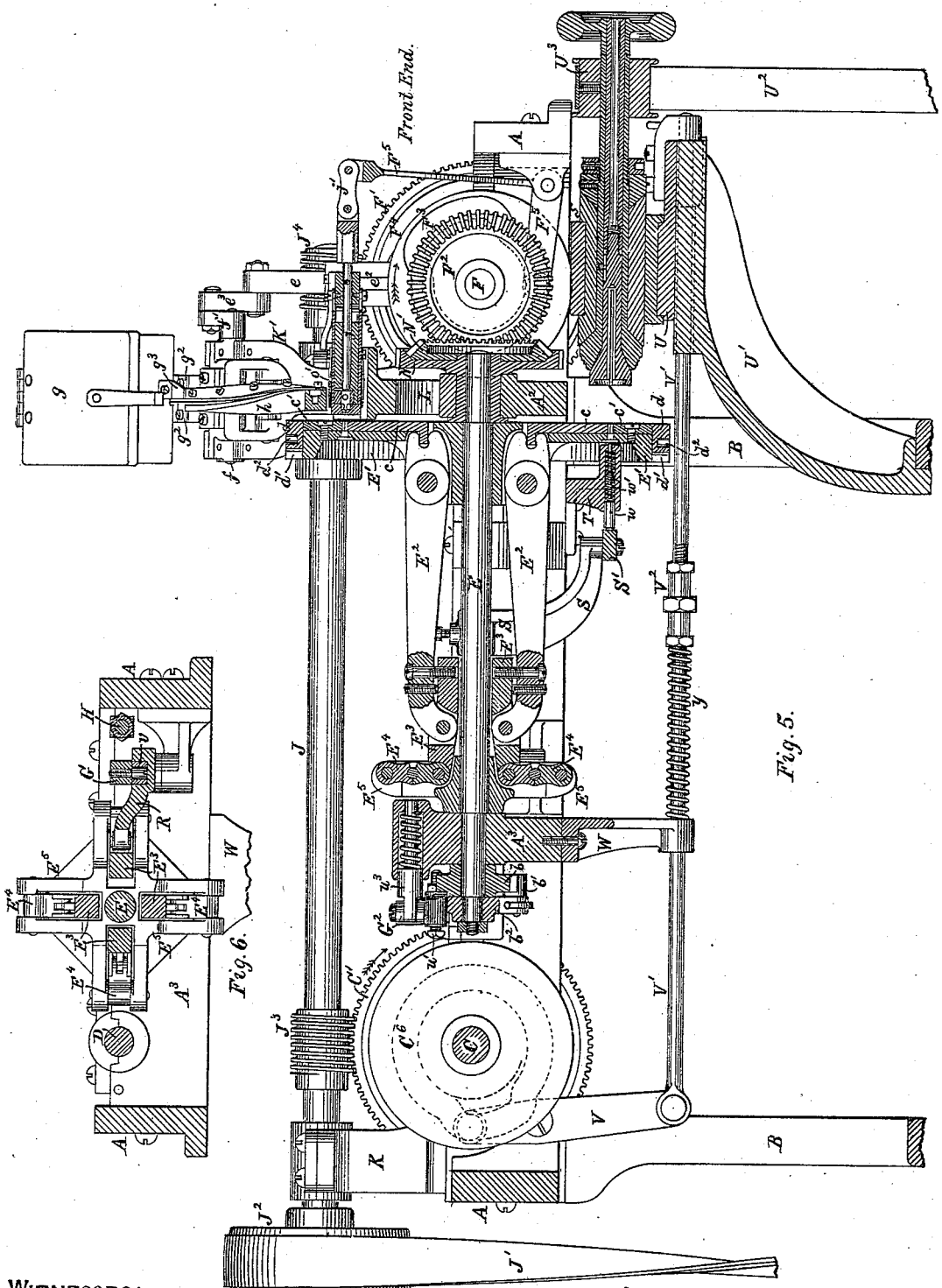

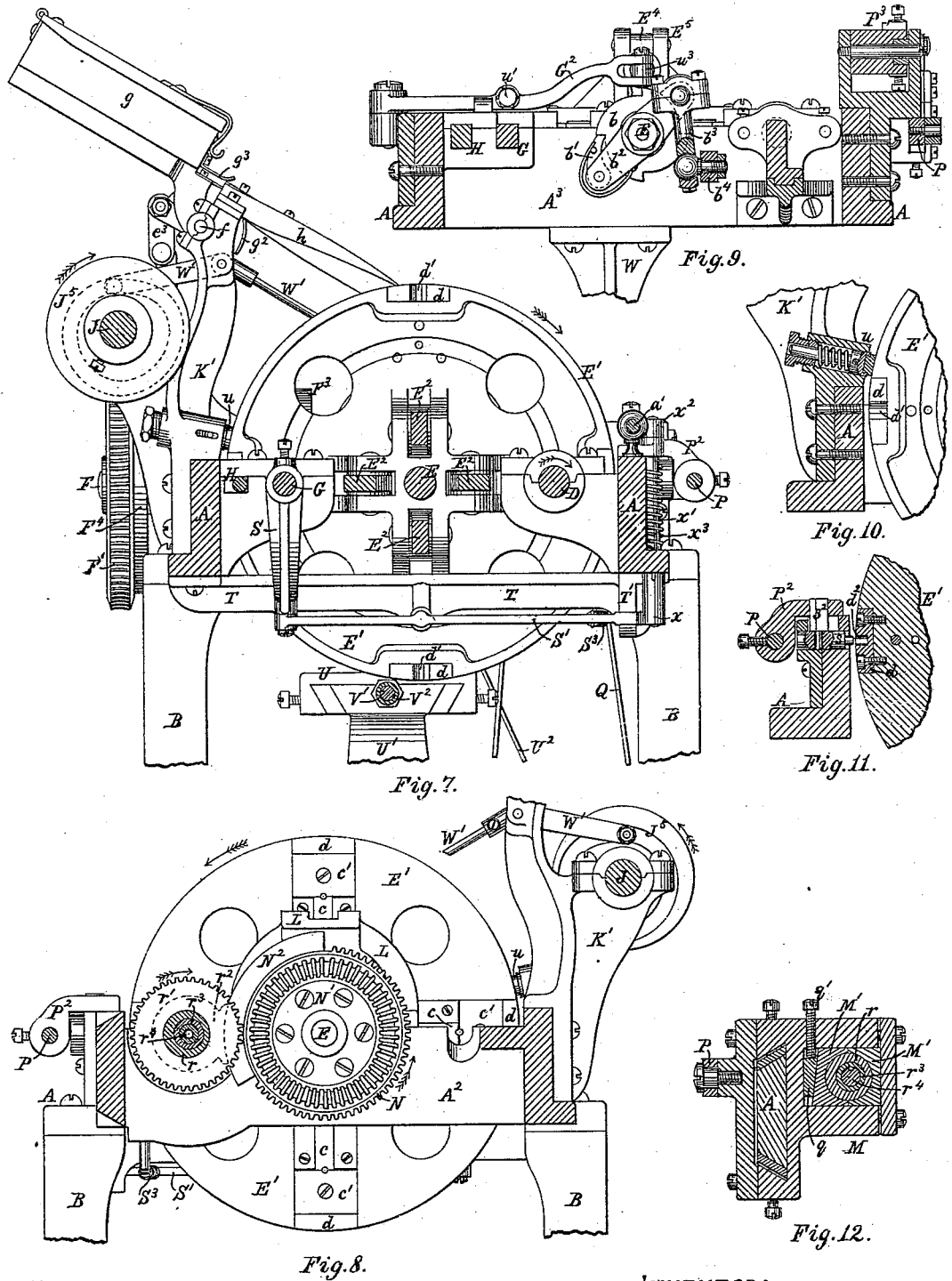

M. BRAY.
Machine for Manufacturing Shoe-Lace Studs.
No. 212,181. Patented Feb. 11, 1879.

7 Sheets—Sheet 7.

WITNESSES:
E. A. Hemmenway
C. H. Dodd

INVENTOR:
Mellen Bray
by N. C. Lombard,
ATTORNEY.

N. PETERS, PHOTO-LITHOGRAPHER, WASHINGTON, D. C.

UNITED STATES PATENT OFFICE.

MELLEN BRAY, OF NEWTON, MASSACHUSETTS.

IMPROVEMENT IN MACHINES FOR MANUFACTURING SHOE-LACE STUDS.

Specification forming part of Letters Patent No. 212,181, dated February 11, 1879; application filed September 18, 1878.

*To all whom it may concern:*

Be it known that I, MELLEN BRAY, of Newton, in the county of Middlesex and State of Massachusetts, have invented a new and useful Machine for Manufacturing Shoe-Lace Studs, of which the following, taken in connection with the accompanying drawings, is a specification.

My invention relates to the means employed to separate the blanks, feed them to the operating-tools, hold them in position while being acted upon thereby, drilling out the shank to form a hollow tube, cutting a groove in the head to form an eccentric neck to receive the lacing, and shaping the outer collar of the hook-head of the stud described in Letters Patent No. 188,780, granted to Alfred Dawes March 27, 1877; and it consists, first, in the combination of an intermittently-rotating and clamp-carrying disk, adapted to receive, clamp, and hold in a fixed position therein the blanks, and convey them in succession to the different points of operation, a drill arranged upon one side of said disk, and adapted to be rotated at a high rate of speed about an axis perpendicular to the plane of revolution of said disk, and to be moved endwise toward said disk for the purpose of drilling out the shank of a stud-blank held in the clamping-jaws, and a cutting-tool arranged upon the opposite side of said disk, and adapted to be moved toward and from said disk in a direction at right angles to the plane of movement thereof, and then to be moved laterally to form an eccentric neck in the head of a stud at the same time that a shank is being drilled.

My invention further consists in the combination of an intermittently-rotating disk having mounted thereon and rotating therewith two or more pairs of automatically-operated clamping jaws or dies, an automatically-operated drill and a discharge-plunger arranged upon one side of said disk, and adapted to operate upon different studs at the same time, and a rotating cutting-tool arranged upon the opposite side of said disk, and adapted to be moved toward and from said disk in a direction at right angles to the plane of movement thereof, and then to be moved laterally to form an eccentric neck in the head of a stud-blank while the shank is being drilled.

My invention further consists in the combination of a disk mounted upon one end of a shaft, and having mounted in suitable bearings thereon two or more pairs of clamping jaws or dies, two or more levers pivoted to said disk or spider, and each connected at one end to the movable portion of one of said clamping-jaws, and at the other end to a toggle-joint, a spider or skeleton frame mounted upon the opposite end of said disk-shaft, and forming bearing-supports for the fulcrum-pins of the several lever-operating toggles, all adapted to be intermittently rotated about a common axis, to carry a blank held by either pair of clamping-jaws from the point where it is received successively to a position in line with the several operating-tools, a reciprocating plunger in a position and adapted to act upon a toggle to straighten it, and thereby cause the movable jaw to close upon and clamp the blank immediately after said blank is fed between said movable jaw and the fixed jaw, and a vibrating lever in a position and adapted to act upon another toggle, to break or bend it from a straight line, to release the pressure of the clamping-jaws upon the finished stud preparatory to its being discharged from the machine.

My invention further consists in the combination, with an intermittently-rotating disk having mounted thereon a series of clamping jaws or dies adapted to receive a blank, to be automatically closed upon it while the disk is in a state of rest, and hold it firmly during the several operations of drilling the shank and shaping the head of the stud, and then unclamp the finished stud to allow it to be discharged, of a device for separating a single blank from others in bulk and feeding it between a pair of jaws, two rotary cutters for finishing the heads of the studs, all arranged upon one side of the disk, and each opposite a different pair of jaws when said disk is in a state of rest, and an automatically-operated drill and a discharge-plunger arranged upon the opposite side of said disk and adapted to be moved endwise toward and from said disk in paths perpendicular to the plane of revolution of said disk, and to act upon different studs or blanks at the same time.

My invention further consists in a peculiar arrangement and combination of devices for separating a single blank from a number placed in a hopper in bulk, and feeding it into a position to be seized and held by its shank between a pair of clamping-jaws, the novel features of which will be best understood by reference to the description of the drawings.

My invention further consists in the combination of a tubular spindle, a furcated chuck-head fitted to a conical bearing in said spindle, and adapted to be revolved therewith and to be moved endwise therein, and having formed in its outer end an undercut circular recess, and a partially-divided ring tool-holder, provided with a hub having a conical or tapering periphery, and adapted to fit the recess in the chuck-head, as a means of securing the tool-holder thereto.

My invention further consists in the combination of a cutter-carrying spindle adapted to be revolved at a high rate of speed about its axis and to be moved endwise and an eccentric sleeve surrounding and forming the bearing for said spindle, and mounted in a suitable bearing or bearings, and adapted to be intermittently rotated within said bearing to feed the cutter to its work by causing the axis of the cutter-spindle to move through a small circle eccentric to the axis of the blank being acted upon by the cutter, thus forming a circular neck upon the stud, located eccentric to its shank and the two collars of its head.

My invention further consists in the combination of a cutter-head stock, a cutter-carrying spindle having its bearing in an eccentric sleeve adapted to be intermittently revolved within its bearing in said cutter-head stock, and all adapted to be intermittently reciprocated in a direction parallel with the axis of the cutter-spindle, and a locking device for holding said cutter-head stock in a fixed position while the cutter is forming the neck of a stud.

My invention further consists in the use of an annular cutter for cutting the groove to form the eccentric neck, composed of a chisel-shaped tool fitted to a dovetailed groove in the side of a ring-holder, cut open upon one side in the rear of the tool, and adapted to clamp and hold said tool in position by the spring of the holder, in combination with a furcated chuck or socket adapted to clamp said ring-holder and spring it onto the chisel-pointed tool, the cutting-point of the tool being toward the center of the ring-holder.

My invention further consists in the combination of a cutter-carrying spindle adapted to be continuously revolved about its axis at a high rate of speed, an eccentric sleeve surrounding and forming a bearing for said spindle, mounted in a bearing or bearings encompassing its periphery, and adapted to be intermittently rotated therein at regular and equal intervals of time, with a period of rest after each complete revolution, and a locking device adapted to prevent said eccentric sleeve from being accidentally moved about its axis during its period of rest.

Figure 2:
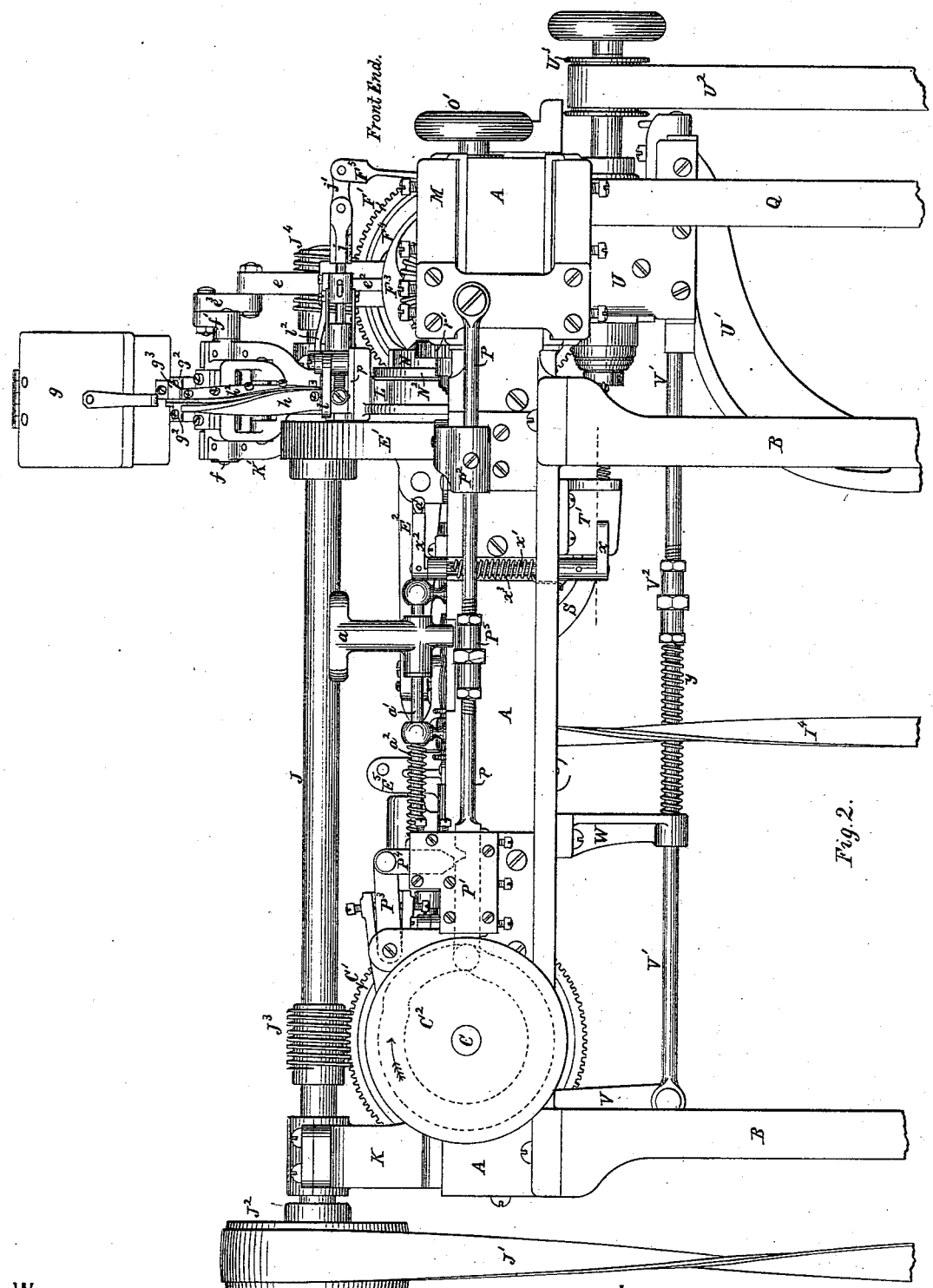
Figure 3:
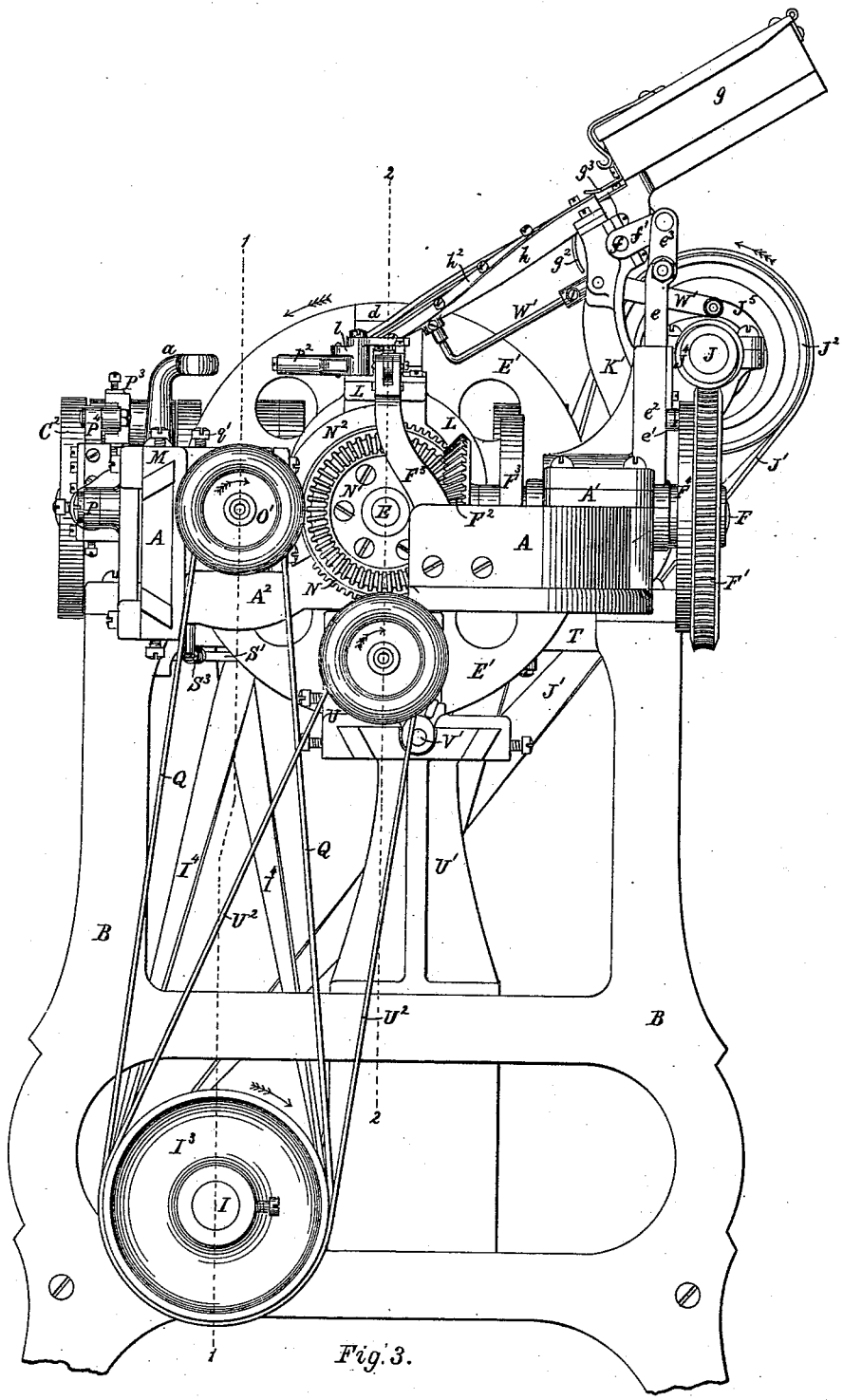
Figure 16:
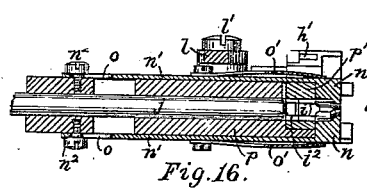
Figure 14:
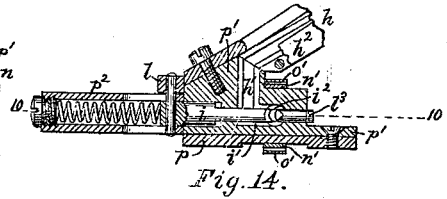
Figure 17:
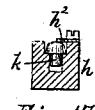
Figure 13:
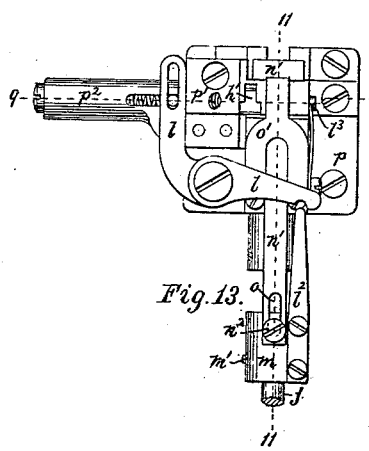
Figure 15:
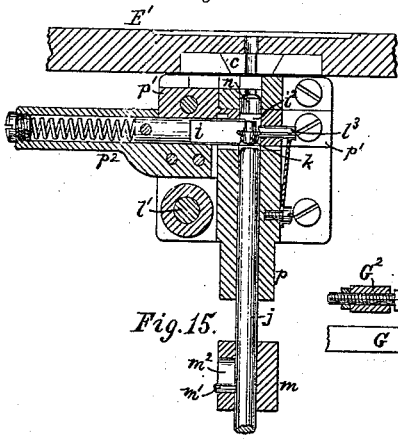
Figure 20:
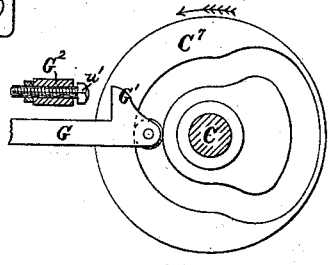
Figure 18:
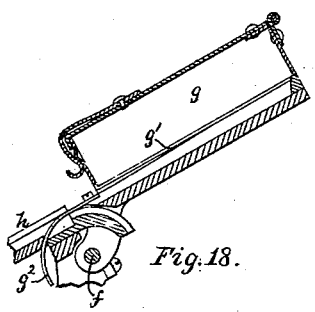
Figure 19:
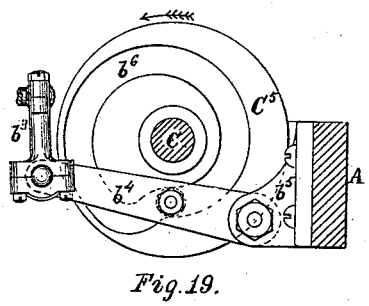
Figure 21:
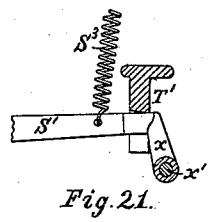
Figure 22:
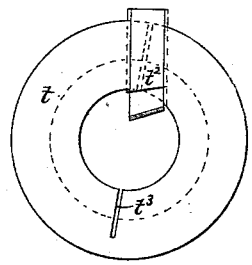
Figure 23:
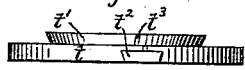
Figure 24:
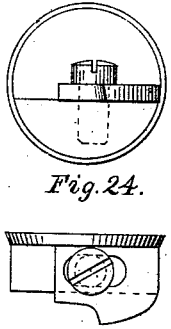
Figure 25:
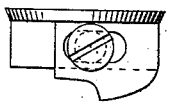

Figure 1 of the drawings is a plan of a machine embodying my invention. Fig. 2 is a side elevation. Fig. 3 is an elevation of the front end. Fig. 4 is a vertical longitudinal section on line 1 1 on Fig. 3. Fig. 5 is a vertical longitudinal section on line 2 2 on Fig. 3, looking toward the hopper. Fig. 6 is a partial vertical transverse section on line 3 3 on Fig. 1. Fig. 7 is a vertical transverse section on line 4 4, looking toward the front end. Fig. 8 is a vertical transverse section on line 5 5 on Fig. 1, looking toward the rear. Fig. 9 is a vertical transverse section on line 6 6 on Fig. 1, looking toward the front end. Fig. 10 is a vertical section through one side of the bed-frame, a portion of the disk, and the friction-brake. Fig. 11 is a partial vertical section on line 7 7, looking toward the rear. Fig. 12 is a vertical section on line 8 8 on Fig. 1, looking toward the rear. Fig. 13 is a plan of the blank separating and feeding mechanism detached from the inclined chute and other parts of the mechanism. Fig. 14 is a vertical section on line 9 9 on Fig. 13, with piece of chute attached. Fig. 15 is a horizontal section on line 10 10 on Fig. 14, and showing a portion of the disk in section and the movable clamping-jaw in plan. Fig. 16 is a vertical section on line 11 11 on Fig. 13. Fig. 17 is a transverse section of the inclined chute. Fig. 18 is a central vertical section through the hopper and a portion of the inclined chute. Fig. 19 is a detached elevation of the cam, lever, and connecting-rod for imparting the intermittent rotary motion to the disk. Fig. 20 is an elevation of the cam for operating the discharge-plunger. Fig. 21 is a detail, illustrating the connection of the testing-lever with the shipping mechanism. Figs. 22 and 23 are, respectively, an elevation and edge view of the neck-forming cutter-tool; and Figs. 24 and 25 are, respectively, an elevation and plan of the head-trimming cutter-tool.

A is the bed-frame, supported upon the legs B, and having mounted in suitable bearings therein the cam-shaft C, drill spindle D, disk-shaft E, gear-shaft F, discharge bar or rod G, and registering-rod H, all arranged as shown, and operated as will be hereinafter described.

The drill-spindle D is provided with the two tight pulleys $D^1$ and $D^2$ and the loose pulley $D^3$, and is revolved at a high rate of speed by means of a belt (not shown) leading from an overhead counter-shaft (also not shown) onto the pulley $D^1$, which belt may be shipped onto the loose pulley $D^3$ by the shipper fork $a$, shipper-rod $a^1$, and spring $a^2$ when it is desired to stop the machine, said drill-spindle being moved endwise to feed the drill to its work by the cam $C^4$, the construction, arrangement, and mode of operating the drill-spindle being substantially the same as described in Letters Patent No. 188,773, granted to me March 27, 1877, for rivet-drilling machine.

I is a shaft, mounted in bearings on the cross-ties of the legs B, having secured thereon the pulleys $I^1$, $I^2$, and $I^3$, and has a rotary motion imparted thereto by means of the belt I⁴, leading from the pulley D² on the drill-spindle to and around the pulley I¹.

A belt, J¹, leading from the pulley I² to and around the pulley J² on the shaft J, imparts thereto a rotary motion about its axis, said shaft being mounted in bearings in the upper ends of the stands K and K′, bolted to the sides of the frame A, and has mounted thereon the worms J³ and J⁴ and the cam J⁵.

The worm J³ engages with the worm-wheel C¹ on the cam-shaft C, and by its action thereon imparts a slow rotary motion to said shaft and the cams C², C³, C⁴, C⁵, C⁶, C⁷, and C⁸, all secured firmly thereto in their proper relative positions.

The shaft E has firmly secured thereto near its front end the disk E¹, to the back side of which are pivoted the four levers E², the long arms of each of which extend backward therefrom parallel, or nearly so, to said shaft, and have pivoted thereto the adjusting-saddles E³, to which is pivoted the inner end of the toggle E⁴, the outer end of which is pivoted to the spider E⁵, secured firmly to the shaft E.

A ratchet-wheel, b, is firmly secured to the shaft E at its rear end, with which the pawl b¹, hung upon the lever b², engages, said lever b² being mounted loosely upon the shaft E, and connected at its other end by means of the connecting-rod b³ and ball-and-socket joints with the movable end of the lever b⁴, pivoted at its opposite end to the stand b⁵, and provided with a truck, which fits into and is acted upon by the path b⁶ in the cam C⁵, adapted to impart an intermittent rotary motion to the disk E¹ at regular and equal intervals of time, said disk moving through an arc of ninety degrees at each intermittent movement.

The forward end of each of the levers E² is forked, and engages with a lug projecting from the rear side of the movable jaw or die c, fitted to a dovetail bearing in the front face of the disk E¹, in such a manner that it may be moved radially in said bearing, said jaw or die being made of a thickness about equal to the length of the shank of the stud-blank to be operated upon, and has formed across said outer end a semi-cylindrical groove adapted to fit said shank and clamp and hold it in conjunction with the fixed or stationary jaw or die c′, provided upon its inner end with a corresponding semicircular groove.

Just outside of the fixed die c′ is set in the periphery of the disk the hardened steel plate d, in the edge of which is formed a V-shaped detent-notch, d¹, with which the beveled or tapering forward end of the registering-rod H fits to correct any inequality in the movement of the disk and bring it into accurate position relative to the drill and cutting-tools. A radial hole, d², is also formed in each of the plates d, the purpose of which will hereinafter appear.

The worm J⁴ engages with and causes to rotate the worm-wheel F¹, firmly secured upon the outer end of the shaft F, mounted in a single bearing, A¹, in the front end of the frame A, and having secured upon its inner end the bevel-gear wheel F² and cam F³. Secured to the inner side of the worm-wheel F¹ is a path-cam, F⁴, the path of which engages with a truck, e¹, mounted upon a pin projecting from the perpendicular bar e, and imparts to said bar a vertical reciprocating motion in the bearing formed for the purpose in the stand e², projecting upward from the cap of the bearing A¹, the upper end of said bar e being connected by means of the link e³ with the movable end of the lever f′, secured upon the end of the shaft f, having its bearings in a side branch of the stand K′, and having firmly secured thereon the hopper g, all so arranged that the vertical reciprocation of the bar e shall cause the hopper g to be vibrated about the axis of the shaft f, so as to be inclined in opposite directions at the two extremes of its movement, for the purpose of agitating the blanks placed therein and cause them to drop into the slot g¹, formed in the center of its bottom, and be delivered therefrom into the inclined chute h, down the spiral groove of which they slide till they reach the vertical groove h¹, into which they drop one above the other. The spiral groove of the inclined chute h is partially covered by the plate h², and the hopper g is provided with two projecting guide-fingers, g², arranged one upon either side of the groove g¹, and curved concentric with the axis about which said hopper vibrates, the under sides of the heads of the blanks resting upon said fingers as they slide from the hopper to the inclined chute. The hopper g is also provided with a light flat spring, g³, projecting therefrom over the fingers g² in a position to bear lightly upon the heads of the blanks as they pass from the hopper to the chute, and serve, in connection with said fingers, to carry back any blanks that may remain above the end of the chute when the hopper is vibrated away from the chute, and thus prevent them from being accidentally thrown out of the chute or guideway into or among the machinery.

The lower blank in the vertical groove or guide-way h¹ is pushed out from under those above it by the spring-actuated plunger i, and carried along the horizontal guideway i¹ and deposited in the horizontal guideway i², extending across the end of guideway i¹ and at right angles thereto, with its axis parallel with the axis of the disk, and with its smaller or shank end toward the disk in a position to be moved endwise along the guideway i² by the reciprocating plunger j till the shank of the blank enters between the clamping-dies c and c′ with the shoulder of its head bearing against the outer face of said dies.

The feed-plunger j has intermittent reciprocating motion imparted thereto by the cam F³ and the elbow-lever F⁵, the vertical arm of which is a steel spring, and is connected by the link j′ to the plunger j, as shown, the object of the spring-lever F⁵ being to prevent damage to the mechanism in case a blank should become obstructed in any way in the guideway $i^2$, so that it could not be moved into position between the clamping-dies.

The inner end of the spring-operated plunger $i$ is made to conform to the shape of the side of the stud-blank, both longitudinally and circumferentially, as shown in Figs. 14 and 15, whereby the blank $k$ (shown in Fig. 15) is held in a horizontal position, or with its axis coinciding with the axis of the guideway $i^2$ and the feed-plunger $j$, a spring-actuated pin, $l^3$, located directly opposite the plunger $i$, and having its inner end beveled, as shown in Fig. 15, aiding in so holding the blank and serving to prevent the blank from being canted to one side when it is first moved forward by the plunger $j$ by presenting about an equal resistance to such forward motion upon two opposite sides of the blank.

An elbow-lever, $l$, pivoted at $l^1$, is connected at one end to the plunger $i$, and is acted upon at its other end by the push-finger $l^2$, secured to the upper side of the block $m$ loosely mounted upon the plunger $j$ and connected therewith by the pin $m^1$, projecting from the side of the plunger $j$ through the slot $m^2$ in said block in such a manner that the plunger $j$ may be moved through said block during a portion of its movement and then cause said block to move therewith.

The inner end of the guideway $i^2$ is provided with a contracted mouth of a diameter corresponding to the diameter of the shank of the blank, said mouth being composed of two jaws, $n$ $n$, connected by the plates $n^1$ $n^1$ to the block $m$ by means of the screw-pins $n^2$ $n^2$, passing freely through slots $o$ $o$ formed in said plates, said jaws being forced together by the springs $o'$ $o'$, all as shown in Fig. 16.

The bed or frame in which are formed the guideways $h^1$, $i^1$, and $i^2$, is composed of three pieces, $p$, $p^1$, and $p^2$, secured together by screws or rivets for convenience in constructing the several guideways, the whole being supported upon and secured to the arched stand L, bolted to the cross-tie $A^2$ of the frame A.

M is a cutter-head stock, having mounted in suitable boxes M' M', adapted to be adjusted by the wedge $q$ and screw $q'$, a sleeve, $r$, the inner bore of which is eccentric to its outer periphery, and having formed upon one end thereof, outside of its bearing, the spur-gear $r^1$ and hub $r^2$, one side of which hub is made concave, as shown in dotted lines in Fig. 8.

A gear-wheel, N, having cogs or teeth on only about two-thirds of its periphery, is mounted by its hub in a bearing in the tie-girt $A^2$, said hub surrounding and forming a bearing for the forward end of the disk-shaft E, which revolves freely therein.

To the front face of the wheel N is secured the bevel-wheel $N^1$, which engages with and is rotated by the bevel-gear wheel $F^2$.

To the rear side of the gear-wheel N, opposite that portion of its periphery where there are no teeth, is secured the segmental plate $N^2$, the outer edge of which engages with the concave side of the hub $r^2$ and effectually locks the sleeve $r$, and prevents it from being accidentally revolved during the time that the cutter-head is being moved toward or from the disk.

A tubular spindle, $r^3$, is fitted to the bore of the eccentric sleeve $r$ with a conical bearing therein at its inner end, and having secured to its other end the pulley O, also having a conical bearing against the eccentric sleeve $r$, and adapted to be adjusted upon said tubular spindle to take up the wear.

To the inner end of the tubular spindle $r^3$ is fitted the furcated chuck-head $r^4$, having a taper bearing therein, and connected to the spindle, so as to be compelled to revolve therewith by a longitudinal slot formed in its shank and a pin passing through said tubular spindle into said slot.

The chuck-head $r^4$ is drawn into the conical mouth of the tubular spindle $r^3$ by means of the hand-wheel O' and its tubular shank, the inner end of which screws onto the end of the shank of the chuck-head, as clearly shown in Fig. 4.

The cutter-head stock M is fitted to and mounted upon a dovetailed slide formed upon an extension of the left-hand side bar of the frame A, along which it may be moved toward or from the disk by means of the rod P, attached by one end to said head-stock, and having its other end acted upon by the path-cam $C^2$ to impart thereto a short reciprocating motion, said rod being guided by the bearing $P^1$, as shown in Fig. 2.

To insure perfect and uniform work in cutting the neck of the stud, it is important that the disk should be locked to prevent the slightest circumferential or other movement during the time the neck is being formed, and also that the cutter-head stock should be held firmly in a fixed position while the cutter is operating upon the stud to form the neck. This is accomplished in the following manner: The disk is first brought into position with the axis of the blank held between the clamping-jaws in line with the axis of the drill by means of the registering bar or rod H, to which an intermittent reciprocating motion is imparted by the cam $C^3$, and then the disk $E^1$ is locked by the bolt $s$ being forced radially into the hole $d^2$ in the plate $d$ by the inclined slot $s^1$ in the arm $P^2$, secured upon and moving with the rod P, acting upon the pin $s^2$, projecting upward from the bolt $s$, as shown in Fig. 11.

When the cutter-head stock M has completed its motion toward the disk and before the eccentric sleeve $r$ commences to rotate to move the cutter into contact with the stud for the purpose of cutting the neck, the cam $C^3$, acting upon the lever $P^3$, causes the tapering lower end of the registering and locking bolt $P^4$ to be forced into a detent-notch having tapering sides formed in the upper edge of the rod P, as shown in dotted lines in Fig. 2, thus correcting any irregularities in the forward movement of the cutter-head stock, caused by wear of the parts or otherwise, and firmly locking the same in position.

The cutter-head stock may be adjusted nearer to or farther from the disk by means of the coupling $P^5$, connecting the two parts of the rod P by means of right and left hand screw-threads.

The end of the chuck-head $r^4$ has formed therein a recess, the walls of which are slightly undercut to receive and close upon the dovetailed hub $t^1$ of the tool-holding ring $t$, in which is set the cutter $t^2$, fitted to a dovetailed groove in the side thereof, said ring being cut apart in the rear of said cutter, and cut nearly apart upon the opposite side thereof by the slit $t^3$, as shown in Figs. 22 and 23.

The clamping of the chuck-head $r^4$ upon the ring-holder $t$ causes said ring to be nipped upon the cutter $t^2$ and hold it firmly in position.

The cutter-spindle and eccentric sleeve are so arranged and adjusted that when the eccentric sleeve is at rest the axis of the cutter-spindle shall coincide, or nearly coincide, with the axis of the stud-blank clamped in the disk and with the axis of the drill, with the cutter $t^2$ at such a distance from the center of said spindle that the head-stock may be fed toward the disk with the cutter revolving about the head of the blank without touching said head.

Rotary motion is imparted to the cutter-spindle by means of the belt Q, leading from the pulley $I^3$ to and around the pulley O.

Friction is applied to the periphery of the disk to prevent too great a movement around its axis by the spring-pressed brake $u$, as shown in Fig. 10.

The discharge bar or rod G carries at its rear end a truck, with which the path of the cam $C^7$ engages, and imparts to said rod an intermittent endwise motion.

An upwardly-projecting lug, $G^1$, is formed on the rear end of the bar G, and engages with the adjustable bolt-head $u^1$, set in the lever $G^2$, causing the movable end of said lever, together with the plunger $u^3$, connected thereto, to be moved toward the disk to straighten the toggle $E^4$, which at the time is directly over the shaft E, thereby depressing the rear end of a lever, $E^2$, and causing the clamping-jaw $c$ to close upon and clamp a blank just fed between it and the jaw $c'$.

The bar G also has mounted upon a suitable stud set in its under side a truck, $v$, which fits into the curved path $v^1$, formed in the upper side of the curved lever R, pivoted at $v^2$ to a stand or ear projecting inward from the frame A, all so arranged that a movement of the bar G toward the disk will cause the lever R to vibrate about its fulcrum and its free end to strike and break or throw out of a straight line one of the toggles $E^4$, and remove the pressure of the clamping-jaws from the finished stud when in a position to be discharged.

The front end of the bar G has set therein a steel discharge-plunger, $v^3$, which engages with the tubular end of the stud and forces it out of the disk when the bar G is moved forward.

S is a curved arm secured upon the bar G and moving therewith, to the lower end of which is pivoted one end of the lever $S^1$, extending horizontally across the machine in the rear of the disk, the opposite end of which rests in a slot in an ear of the girt T, and is held against the end of said slot by the spring $S^3$, as shown in Fig. 21.

In a central hub of the girt T, directly in the rear of and in line with the center between the lower pair of clamping-dies in the disk when at rest, is mounted a testing-point, $w$, surrounded by a spring, $w'$, which tends to move it away from the disk and keep its head bearing against the lever $S^1$, as shown in Fig. 5.

A lever, $x$, having a cam-shaped inner edge to rest against the end of lever $S^1$, is secured upon the lower end of a short vertical shaft, $x^1$, mounted in suitable bearings and carrying at its upper end the stop-pawl $x^2$, which is made to engage with a notch in the side of the shipper-rod $a^1$ by the tension of the spring $x^3$, coiled around the shaft $x^1$.

At every forward movement of the bar G the end of the lever $S^1$, connected thereto, is moved a given distance and causes the testing-pin $w$ to be advanced into the hollow of the tubular shank of the stud, the other end of said lever remaining in contact with the end of the slot in the ear $T'$ of the girt T; but if from any cause a stud should reach the position in front of the testing-point $w$ without having its shank drilled out, or only partially drilled out, the point $w$, when it is moved forward by the lever $S^1$, comes in contact with the solid center of the stud and its forward motion is arrested, and as a consequence the middle of the lever $S^1$ cannot move farther toward the disk, but the pin $w$ becomes a fulcrum around which the lever $S^1$ pivots; and while the end connected to arm S continues to move toward the disk, the opposite end is moved in the opposite direction, and acting upon the cam-shaped inner edge of the lever $x$ causes it and the pawl $x^2$ to be moved outward, disengaging the shipper-rod $a^1$, and allowing the spring $a^2$ to act to ship the belt and stop the machine.

U is a cutter-head stock mounted and adapted to be reciprocated upon a dovetailed slide formed upon the stand $U^1$, secured to the cross-ties of the legs B.

The cutter-head U is fitted up with boxes, adjusting-wedge, and screw, hollow spindle, furcated chuck-head, hand-wheel, driving-pulley, and tubular coupling-spindle for operating the chuck-head, all constructed and arranged as in the cutter-head stock M; but no eccentric sleeve is used in the head-stock U.

Rotary motion is imparted to the spindle of the cutter-head U by means of the belt $U^2$, leading from the pulley $I^3$ to and around the pulley $U^3$ on said spindle.

The chuck-head carries a cutter-head and cutter substantially like that shown in Figs. 24 and 25, and is arranged with its axis in line with the center of the lowest pair of clamping-dies when the disk is at rest.

A reciprocating motion is imparted to the cutter-head stock U by means of the cam $C^6$, lever V, and rod $V^1$, said rod being made in two parts, connected together by means of the coupling-sleeve $V^2$, provided with right and left hand screw-threads in a well-known manner.

A spring, $y$, surrounds the rod $V^1$ between the coupling-sleeve $V^2$ and the stand W, bolted to the under side of the cross-tie $A^3$ of the frame A, and through which the rod V passes, said spring serving to keep the cam-truck on the lever V bearing against the inner wall of the path in the cam $C^6$ and present a resistance to the movement of the cutter-head stock toward the disk sufficient to prevent it from jumping toward the disk in such a way as to injure the head of the stud.

What I claim as new, and desire to secure by Letters Patent of the United States, is—

1. In combination with an intermittently-rotating and clamp-carrying disk adapted to receive the blanks, hold them in a fixed position therein, and convey them in succession to the different points of operation, and then remain in a state of rest while the blanks are being operated upon, an automatically-operated drill arranged upon one side of said disk, with its axis at right angles to the plane of revolution of said disk, and adapted to be moved endwise toward and from the same, and a cutting-tool arranged upon the other side of said disk and adapted to be rotated at a high rate of speed, and to be moved toward and from the disk at right angles to the plane of movement thereof, and laterally to form an eccentric neck in the head of a stud at the same time that a shank is being drilled, substantially as described.

2. In combination with an intermittently-rotating disk having mounted thereon and rotating therewith two or more pairs of automatically-operated clamping-dies, an automatically-operated drill and a discharge-plunger arranged upon one side of said disk, and adapted to operate upon different studs at the same time, and a rotating cutting-tool arranged upon the other side of said disk, and adapted to be moved toward and from the disk at right angles to the plane of movement thereof, and then to be moved laterally to form an eccentric neck in the head of a stud while a shank is being drilled, substantially as described.

3. The combination of the disk $E^1$, two or more pairs of clamping-dies, $c$ $c'$, two or more levers, $E^2$, two or more toggle-joints, $E^4$, and the spider $E^5$, all mounted upon and adapted to be intermittently revolved with the shaft E, and an automatically-operated push-pin or plunger adapted to act upon and straighten each of the toggles $E^4$ in succession, substantially as and for the purposes described.

4. The combination of the disk $E^1$, two or more pairs of clamping-dies, $c$ $c'$, two or more levers, $E^2$, two or more toggles, $E^4$, and the spider $E^5$, all mounted upon and adapted to be intermittently rotated with the shaft E, an automatically-operated push-pin or plunger adapted to straighten each of said toggles in succession, and an automatically-operated push-point adapted to break or bend each of said toggles in succession, substantially as and for the purposes described.

5. In combination with three or more pairs of automatically-operated clamping-dies, mounted upon an intermittently rotating disk, each adapted to close upon a blank while the disk is in a state of rest, hold it firmly during the several operations of drilling the shank and shaping the head of a stud, and then release it, a mechanism for separating a single blank from others in bulk and feeding it between a pair of dies, and two rotating cutters for finishing the heads of the studs, all arranged upon one side of said disk, and each opposite a different pair of said dies when the latter are at rest, and an automatically-operated drill and a discharge-plunger arranged upon the other side of said disk, and adapted to act upon two different studs at the same time, substantially as and for the purposes described.

6. In combination with the vertical guideway $h^1$, horizontal guideways $i^1$ and $i^2$, and plungers $i$ and $j$, the spring-actuated stop-pin $l^3$, all arranged and adapted to operate substantially as and for the purposes described.

7. In combination with the horizontal guideway $i^2$ and the feed-plunger $j$, the plunger $i$, spring-actuated pin $l^3$, and the yielding jaws $n$ $n$, all arranged and adapted to operate substantially as and for the purposes described.

8. The combination of the feed-plunger $j$, the block $m$, mounted loosely on said plunger and provided with the push-finger $l^2$, the elbow-lever $l$, plunger $i$, and guideways $h^1$, $i^1$, and $i^2$, all arranged and adapted to operate substantially as and for the purposes described.

9. In combination with the vibrating hopper $g$, guide-fingers $g^2$, and inclined chute $h$, the spring $g^3$, arranged and adapted to operate substantially as and for the purposes described.

10. The combination of the hollow spindle $r^3$, the furcated chuck-head $r^4$, fitted to a conical bearing in said sleeve and connected therewith so as to be compelled to revolve therewith while it may be freely moved endwise therein, and provided in its outer end with a circular recess having a slightly undercut periphery, and the partially-divided ring tool-holder $t$, provided with the hub $t^1$, having a conical or tapering periphery, and a dovetailed radial groove to hold the cutting-tool $t^2$, all arranged and adapted to operate substantially as described.

11. In combination with a cutter-carrying spindle adapted to be revolved at a high rate of speed and to be moved endwise at the same time, an eccentric sleeve surrounding and forming a bearing for said spindle and adapted to be intermittently rotated about its own axis to impart a lateral motion to said cutter-spindle, substantially as and for the purposes described.

12. The combination of the cutter-head stock M, rod P, provided with a bevel-sided detent-notch and a cam-truck, the stand or bearing $P^1$, registering and locking bolt $P^4$, adjustable lever $P^3$, and cams $C^2$ and $C^3$, all arranged and adapted to operate substantially as and for the purposes described.

13. In combination with the furcated chuck-head $r^4$, having a conical bearing in the tubular spindle $r^3$ and means of drawing it into said conical bearing, the partially-divided annular or ring tool-holder $t$, and the cutter $t^2$, fitted to a dovetailed bearing formed in the side of said ring, substantially as described.

14. The combination of a cutter-carrying spindle adapted to be continuously revolved about its axis at a high rate of speed, an eccentric sleeve surrounding and forming a bearing for said spindle, and adapted to be intermittently rotated about its own axis at regular and equal intervals of time, with a period of rest after each complete revolution, and a locking device adapted to prevent said eccentric sleeve from being accidentally moved about its axis during its period of rest, substantially as described.

Executed at Boston, Massachusetts, this 7th day of September, A. D. 1878.

MELLEN BRAY.

Witnesses:
N. C. LOMBARD,
MELLEN N. BRAY.